US011170405B2

(12) United States Patent
Trainor

(10) Patent No.: US 11,170,405 B2
(45) Date of Patent: Nov. 9, 2021

(54) CROSS-DOMAIN TRACKING FOR CONTEXT AWARE MOBILE SERVICES

(71) Applicant: Oracle International Corporation, Redwood Shores, CA (US)

(72) Inventor: Jarlath Trainor, Belfast (IE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 304 days.

(21) Appl. No.: 15/799,155

(22) Filed: Oct. 31, 2017

(65) Prior Publication Data

US 2019/0130445 A1 May 2, 2019

(51) Int. Cl.
*G06Q 30/00* (2012.01)
*G06Q 30/02* (2012.01)
*G05B 19/418* (2006.01)

(52) U.S. Cl.
CPC ..... *G06Q 30/0255* (2013.01); *G06Q 30/0261* (2013.01); *G06Q 30/0267* (2013.01)

(58) Field of Classification Search
CPC ........... G06Q 30/0255; G06Q 30/0261; G06Q 30/0267
See application file for complete search history.

(56) References Cited

U.S. PATENT DOCUMENTS

| 8,838,477 | B2 * | 9/2014 | Moshfeghi | G06Q 20/3278 705/14.58 |
| 9,419,958 | B2 | 8/2016 | Srivastava | |
| 9,911,290 | B1 * | 3/2018 | Zalewski | G06Q 20/327 |
| 10,499,224 | B2 * | 12/2019 | Griffin | G06Q 20/12 |
| 2014/0365304 | A1 * | 12/2014 | Showers | G01S 5/0252 705/14.55 |
| 2014/0372225 | A1 * | 12/2014 | Tawakol | G06Q 30/0269 705/14.66 |
| 2015/0081474 | A1 * | 3/2015 | Kostka | H04W 88/08 705/26.8 |
| 2016/0165002 | A1 * | 6/2016 | LeBeau | G06Q 50/01 709/204 |
| 2016/0203522 | A1 * | 7/2016 | Shiffert | G06Q 30/0267 705/14.58 |

OTHER PUBLICATIONS

A Survey on Web Tracking: Mechanisms, Implications, and Defenses (Year: 2017).*

(Continued)

*Primary Examiner* — Maria V Vanderhorst
(74) *Attorney, Agent, or Firm* — Potomac Law Group, PLLC

(57) ABSTRACT

Embodiments include systems and methods for cross-domain tracking of online wireless device activity to provide context aware mobile services. A request to access a first website can be received from a wireless device at a web server such that a first product or service is viewed, wherein code that comprises an identifier is stored on the wireless device. A request to access a second website can be received, wherein the wireless device is configured to access the second website in response to a notification from a wireless beacon associated with a physical storefront. The web server can then retrieve the identifier from the wireless device and retrieve an online activity history for the wireless device based on the identifier. Information associated with the storefront and first product or service can be transmitted to the wireless device.

20 Claims, 9 Drawing Sheets

(56) References Cited

OTHER PUBLICATIONS

IBM (http://www.ibmbigdatahub.com/blog/retail-iot-how-stores-are-using-connected-devices-drive-business), retrieved on Oct. 31, 2017.
Google (http://www.the-future-of-commerce.com/2015/10/15/digital-trends-shopping-stores/), retrieved on Oct. 31, 2017.
SAP (https://blogs.sap.com/2016/07/07/digital-how-it-is-transforming-fashion-in-store-customer-service/), retrieved on Oct. 31, 2017.
Deloitte (https://dupress.deloitte.com/dup-us-en/focus/internet-of-things/iot-retail-strategies.html), retrieved on Oct. 31, 2017.
Macy's (http://www.geomarketing.com/macys-to-test-beacon-messages-outside-app-explore-retargeting), mobile marketing platform and in-store analytics companies are all active in this space, with differing technologies, retrieved on Oct. 31, 2017.
Oracle Data Sheet, Oracle Big Data SQL 3.0; copyright 2016.
Oracle, Eloqua Asynchronous Visitor Tracking Scripts, User Guide, dated Jan. 12, 2017.

\* cited by examiner

US 11,170,405 B2

CROSS-DOMAIN TRACKING FOR CONTEXT AWARE MOBILE SERVICES

FIELD

The embodiments of the present disclosure generally relate to providing context aware mobile services to a wireless device.

BACKGROUND

As Internet commerce continues to expand, consumers have generated large volumes of online activity data that relates to real world products or service offerings. In addition, lines between online consumption and traditional brick and mortar consumption have blurred, where many consumers often turn to the Internet to research, compare, or otherwise generally browse products or services they intend to purchase. In some instances, a consumer might narrow a product of interest to a short-list based on their online activity with the aim to purchase the product after viewing it at a storefront, such as a brick and mortar store. In other instances, a consumer may have a casual interest in a product that is viewed online, yet the consumer may later enter a storefront that sells this product without being aware of it.

This consumer behavior has placed additional importance on the interplay between online activity and in-store activity. Brick and mortar retailers and service providers have addressed this behavior change by offering native mobile applications that can serve as an online to in-store link for brick and mortar establishments. However, consumers have not shown an interest in downloading individual native applications for individual stores, and native applications are limited in the amount and types of online activity that can be captured. As a result, wireless device users that are physically present in a storefront are often not provided mobile services that are aware of the wireless device's online activity.

SUMMARY

The embodiments of the present disclosure are generally directed to systems and methods for cross-domain tracking of online wireless device activity to provide context aware mobile services that substantially improve upon the related art.

In an embodiment, at a first time, a request to access a first website can be received from a wireless device at a web server such that a first product or service is viewed by the wireless device, wherein code that comprises an identifier is stored on the wireless device when the first website is accessed. At a second time, a request to access a second website can be received from the wireless device at the web server, wherein the wireless device is configured to transmit the request to access the second website in response to a notification received at the wireless device from a wireless beacon associated with a physical storefront, the wireless beacon being configured to transmit notifications to proximate wireless devices. The web server can retrieve the identifier from the code stored on the wireless device when the second website is accessed at the second time. The web server can then retrieve an online activity history for the wireless device based on the identifier, wherein the online activity history comprises products or services viewed on the wireless device. Information associated with the storefront and first product or service can then be transmitted to the wireless device based on the retrieved online activity history.

In an embodiment, at a first time, a first website can be accessed on a wireless device such that a first product or service is viewed on the wireless device, wherein code that comprises an identifier is stored on the wireless device by a web server when the first website is accessed. At a second time, a notification can be received at the wireless device from a wireless beacon associated with a physical storefront when the wireless device is proximate to the wireless beacon. At the second time, a second website associated with the storefront can be accessed on the wireless device in response to the notification, wherein the identifier is retrieved from the code stored on the wireless device when the second website is accessed, and an online activity history including products or services viewed on the wireless device is obtained by the web server based on the identifier. Information associated with the storefront and first product or service can then be received at the wireless device based on the obtained online activity history.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
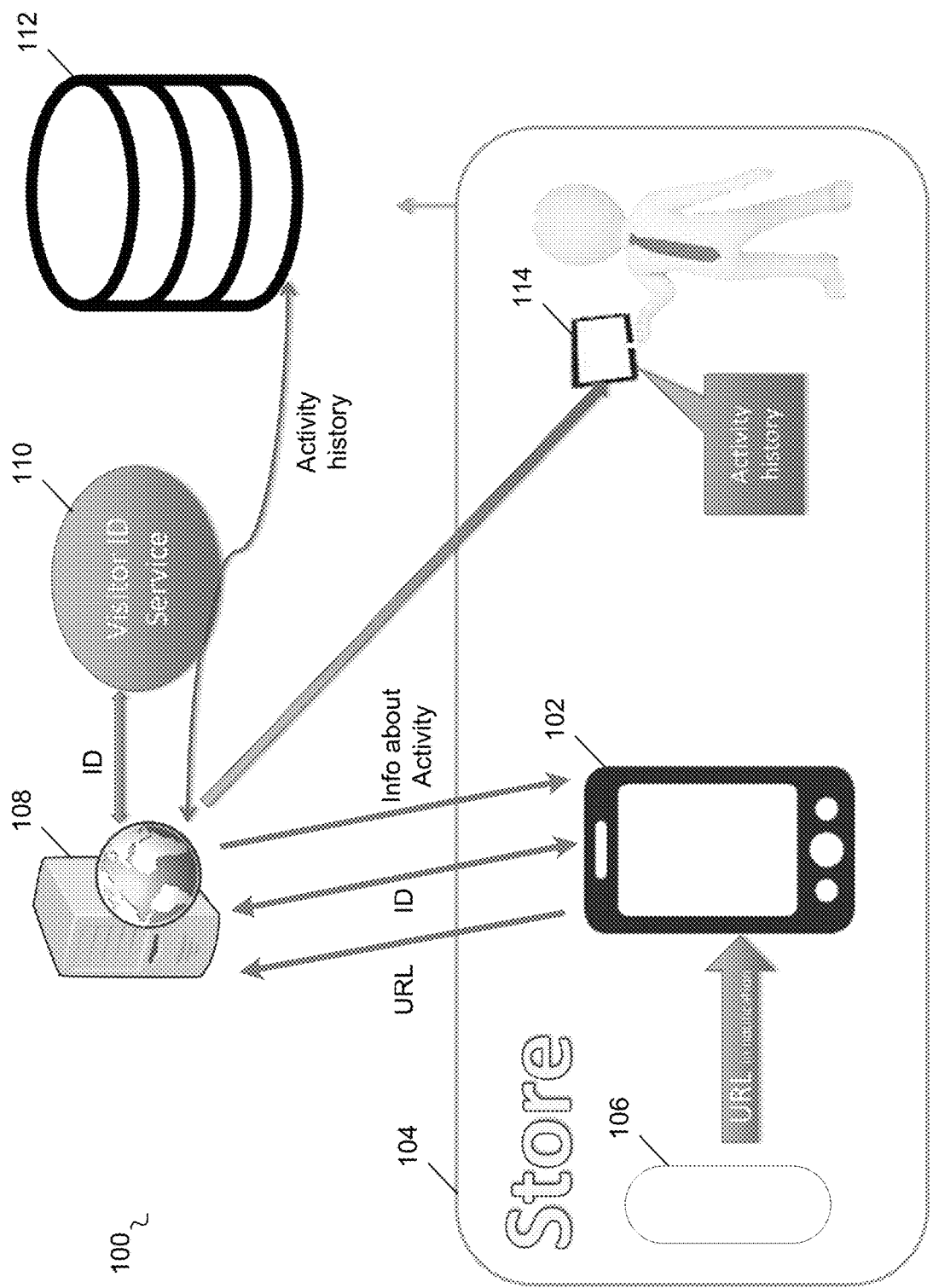
FIG. 1 illustrates a system for cross-domain tracking of online wireless device activity to provide context aware mobile services according to an example embodiment.

Embodiments provide a wireless device physically proximate to a storefront with context aware information about products or services that are associated with the storefront and that relate to the wireless device's online activity. In an example, a wireless transmission device, such as a low energy Bluetooth® beacon, associated with the storefront may transmit a message to proximate wireless devices. A storefront can be any brick and mortar store. The transmitted message can be received by any proximate wireless device configured to receive such messages from such a wireless transmission device. Based on the message, the wireless device is prompted to access a website associated with the storefront. When accessing the website, a cloud service provider that implements the website can retrieve code stored on the wireless device that includes an identifier for the wireless device. This code may have been previously stored on the wireless device by the cloud service provider, and the identifier can be used to track online activity for the wireless device. For example, online activity for the wireless device can be tracked across e-commerce websites, brick and mortar storefront associated websites, product or service aggregator or review websites, social media platforms, and any other suitable websites or domains.

The cloud service provider can then use the identifier to retrieve online activity for the wireless device, such as products or services that were viewed or searched for on the wireless device. Context aware mobile services can be provided to the wireless device in view of the retrieved online activity. For example, information about the availability and/or location at the storefront of one or more products or services previously searched for or viewed online by the wireless device can be provided. This message based interaction that relies on the association between a physical storefront (brick and mortar store) and a uniform resource locator ("URL") allows for a link between a user's online activity and storefront activity without a need for extraneous initial efforts from the user, such as previously downloading a complete native application on the wireless device.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse, or any other suitable user-interface device.

The electronic device may support a variety of applications, such as Internet browser, text messenger, experience management, and various other applications. The various applications that may be executed on the electronic device may use at least one common physical user-interface device. In addition, a common physical architecture of the electronic device may support a variety of applications with user interfaces that are intuitive and transparent. In the discussion that follows, the context aware mobile services are used as an example embodiment, but it should be understood that the user interfaces and associated methods may be readily applied to other applications.

FIG. 1 is a system for cross-domain tracking of online wireless device activity to provide context aware mobile services according to an example embodiment. As shown in FIG. 1, system 100 includes a wireless device 102, which can be a wireless device associated with a consumer, in communication with a wireless transmission source 106 and a cloud service provider 108. The wireless transmission source 106 is associated with a storefront 104, which can be any physical store such as a brick and mortar store. Cloud service provider 108 is in communication with wireless device 102, a visitor ID service 110, a database 112, and computing devices 114, which can be any computing devices (including one or more wireless devices) associated with storefront 104.

Wireless device 102 can be a mobile phone, smartphone, tablet, or any suitable electronic device that communicates using wireless communication protocols (e.g., by transmitting and/or receiving wireless signals with an antenna or transceiver). Wireless device 102 communicates with other wireless devices or wireless access points using a variety of protocols, such as code division multiple access ("CDMA"), global system for mobile communication ("GSM"), long term evolution ("LTE"), Wi-Fi, Bluetooth®, Zigbee, Near-Field Communication ("NFC"), or any other suitable wireless protocol. Wireless device 102 can access wired or wireless communication networks, such as the Internet, by communicating with a network connected access point, such as a base station, access node, wireless router, or any other suitable access point.

Wireless device 102 may support a variety of applications, such as Internet browser, text messenger, experience management, and various other applications. In an embodiment, the Internet browser can be Microsoft Internet Explorer®, Samsung Internet, Google Chrome®, Firefox®, Opera, or any other commercially available browser suitable to implement a Physical Web or similar protocol. Other applications may comprise a user interface client for a messaging platform, such as Facebook Messenger, WhatsApp®, and the like. The various applications that may be executed on wireless device 102 may use at least one common physical user-interface device. In addition, a common physical architecture of the electronic device may support a variety of applications with user interfaces. Computing devices 114 can include one or more wireless devices similar to wireless device 102.

Wireless transmission source 106 can be a wireless transmission device suitable to broadcast messages to wireless devices, such as wireless device 102. In some embodiments, wireless transmission source 106 is part of a network, such as a beacon network deployment. Wireless transmission source 106 can be a low energy Bluetooth® beacon, such as an Eddystone® beacon or any other suitable device capable of broadcasting a uniform resource locator ("URL"), for example in an Eddystone® URL format or similar format. In some examples, wireless transmission source 106 transmits a notification to wireless device 102 using a one to many Bluetooth® broadcast transmission. For example, the transmitted notification can be an advertising data packet that can be rendered as a notification on wireless device 102. Wireless transmission source 106 can include a configurable proximity range within which wireless devices can receive messages (e.g., 5 meters, 50 meters, 100 meters, 150 meters, and the like). Wireless transmission source 106 can also include a configurable transmission interval, such as advertising interval, at which broadcast messages are transmitted.

In an example, wireless device 102 can be configured to allow push notifications from nearby low energy Bluetooth® beacons to be displayed. In some embodiments, wireless transmission source 106 broadcasts a URL in an Eddystone® URL frame format. When received at wireless device 102, the formatted URL can be displayed by wireless device 102 as a push notification containing a link to a hypertext transfer protocol ("HTTP") or secure hypertext transfer protocol ("HTTPS") URL. Wireless transmission source 106 can be any other suitable wireless transmission source that communicates with proximate wireless devices using any other suitable protocol. For example, wireless transmission source 106 can implement any other short range wireless protocol for transmitting notifications, or any other suitable message, to proximate wireless devices.

Cloud service provider 108 can be one or more servers or related computing devices that provide cloud services to communicating network devices. For example, cloud service provider 108 can host one or more websites, web applications, or mobile applications, provide web services, such as an application programming interface ("API"), or provide other variations of software as a service ("SaaS"), platform as a service ("PaaS"), or infrastructure as a service ("IaaS"). Cloud service provider 108 can host one or more websites, such as e-commerce websites, such that financial transactions can be performed over the websites between a merchant associated with the websites and a consumer accessing the websites. In various embodiments, cloud service provider 108 can be a single web server or a plurality of web servers that provide web services.

Cloud service provider 108 is in communication with visitor ID service 110 and database 112. Visitor ID service 110 can be a server or similar computing device that provides visitor tracking services for cloud service provider 108. For example, visitor ID service 110 can expose an API such that cloud service provider 108 can issue an API call to retrieve visitor ID tracking information, such as an identifier for a wireless device. In some embodiments, the identifier issued by cloud service provider 108 is associated with a web browser and wireless device combination. Database 112 is in communication with visitor ID service 110. Cloud service provider 108, visitor ID service 110, and database 112 can track online activity for a wireless device that is in communication with cloud service provider 108, such as wireless device 102. The online activity can be tracked based on an identifier provided by visitor ID service 110.

In some embodiments, the wireless device online activity can be tracked across multiple websites associated with different organizations, such as different online merchants, and across a plurality of domains. For example, cloud service provider 108 can host websites for a plurality or organizations, such as a plurality of online merchants, host websites that provide product or service aggregations or ratings, provide web services for a social media platform, or provide other web services. Wireless device 102's online activity across these websites or platforms can be tracked, for example using an identifier issued by visitor ID service 110.

Cloud service provider 108, visitor ID service 110, and database 112 can be implemented by one or more cloud service products, such as Oracle® Cloud, Oracle® CX Cloud, Oracle® Cloud Commerce Services ("OCCS"), Oracle® Webcenter Sites, Oracle® Maxymiser, Oracle® ID Graph, Oracle® CrossWire, Oracle® Identity Cloud Service, Oracle® Infinity, any other suitable cloud service product or web server, Oracle® database, and/or any other suitable database. Database 112 can be searched using any suitable programming or query language, such as structured query language ("SQL"), extensible markup language ("XML") query ("XQuery"), SPARQL protocol and RDF query language ("SPARQL"), Java, C++, JavaScript, Python, or any other suitable language. Database 112 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

In some embodiments, when wireless device 102 is proximate to storefront 104, context aware information is provided to the wireless device, where the context aware information is about products or services that are associated with storefront 104 and that relate to wireless device 102's online activity. In an example, wireless device 102 is configured to receive communications from proximate wireless transmission sources, and, when in proximity range, wireless device 102 receives a notification from wireless transmission source 106. Based on the notification, wireless device 102 can display a push notification that prompts a user to access a website associated with storefront 104, at least of portion of the website being implemented by cloud service provider 108. When accessing the website, cloud service provider 108 retrieves code from wireless device 102 that includes an identifier issued by visitor ID service 110 (e.g., associated with wireless device 102 or a combination of wireless device 102 and a web browser). For example, visitor ID service 110 may have issued an identifier to wireless device 102 during a previous visit to a website that is at least partially implemented by cloud service provider 108, and cloud service provider 108 may have stored the code that includes this identifier on wireless device 102. The identifier can be used to track online activity for wireless device 102.

For example, wireless device 102 may visit a plurality of websites at least partially implemented by cloud service provider 108 or by affiliated service providers. When wireless device 102 accesses one of these websites, cloud service provider 108 may communicate with visitor ID service 110 to retrieve an identifier for the wireless device or may otherwise retrieve the identifier from stored code on wireless device 102, and cloud service provider 108 may track the online activity for wireless device 102. Cloud service provider 108 may then communicate with database 112 to store the tracked online activity for wireless device 102 in association with the issued identifier.

When cloud service provider 108 receives a request from wireless device 102 to access a website associated with storefront 104, cloud service provider 108 retrieves online activity for wireless device 102 from database 112 based on the identifier stored on the wireless device. Using the online activity and in view of wireless device 102's request to access the storefront associated website, context aware mobile services can be provided to wireless device 102. For example, information about the availability and/or location at storefront 104 of one or more products or services searched for or viewed on the wireless device 102 can be provided. In some embodiments, the message based interaction with a user of the wireless device enables a link between the user's online activity and the storefront without need for extraneous efforts from the user, such as previously downloading a native application on the wireless device.

Figure 2:
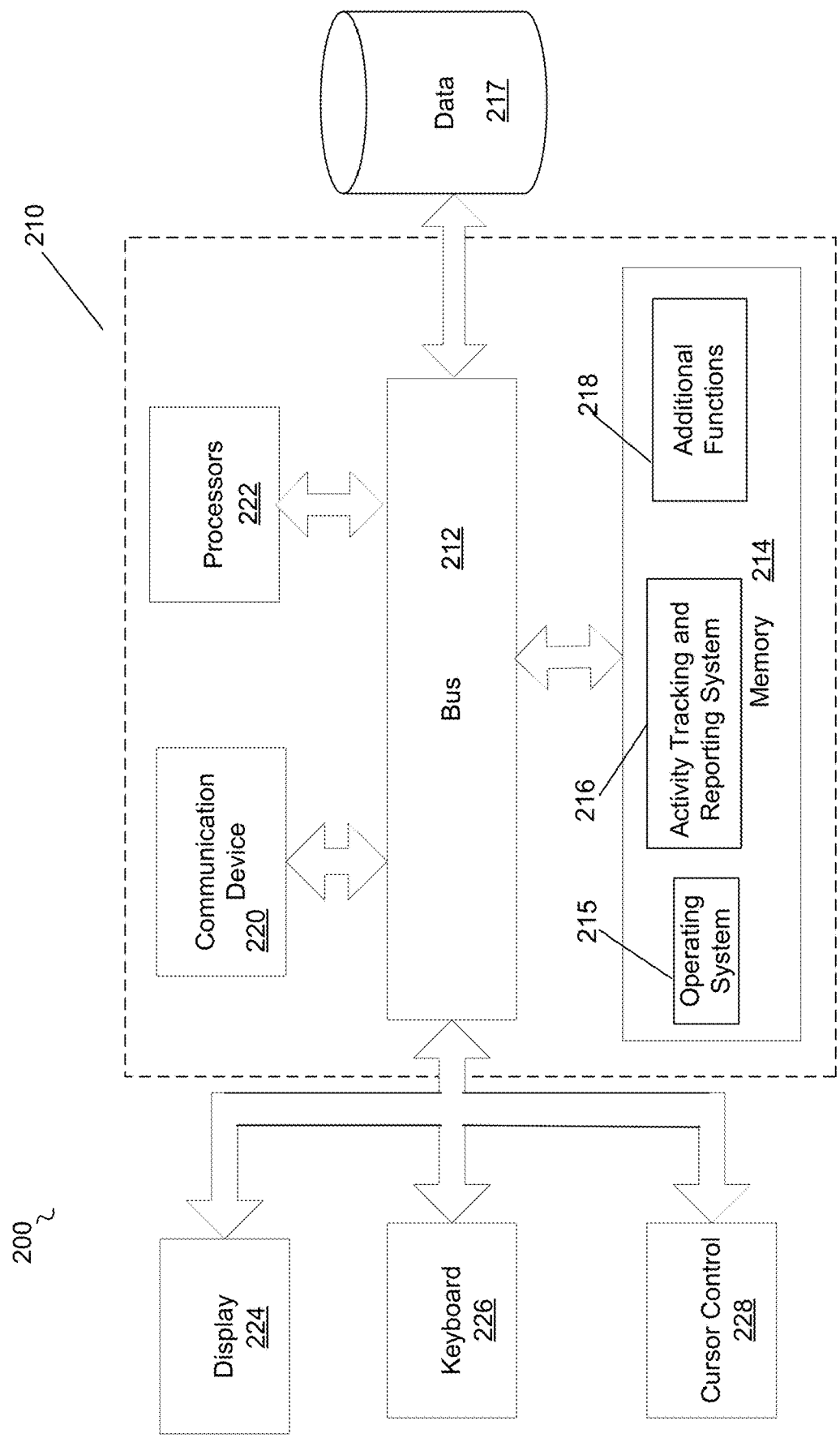
FIG. 2 illustrates a block diagram of a computing device operatively coupled to a cross-domain tracking system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 115, activity tracking and reporting 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, activity tracking and reporting modules 216 configured to track and report wireless device activity, as well as other applications modules 218. Operating system 215 provides operating system functionality for system 200. Activity tracking and reporting modules 216 may include one or more APIs that enables system calls for tracking and reporting wireless device online activity, or may further provide any other functionality of this disclosure. In some instances, activity tracking and reporting modules 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include the various modules of the engagement engine ("EE") embedded in Oracle® Cloud, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a NoSQL database, HFDS, or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.), and system 200 may provide manipulation of dynamically render content of webpages.

In an embodiment, system 200 may be separate from the device, and may remotely provide the aforementioned functionality for the device. Further, one or more component of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Referring back to FIG. 1, embodiments include tracked activity for wireless device 102 across multiple websites, platforms, or web services associated with different organizations, such as different online merchants, and across a plurality of domains. For example, cloud service provider 108 can host websites for a plurality or organizations, such as a plurality of online merchants, and visitor ID service 110 can provide API services to track wireless device 102's online activity across these websites, and in some embodiments, across other websites, online platforms, or web services implemented at least in part by an affiliated cloud service provider. In some embodiments, security and access protocols may be established to secure data from different organizations. For example, data for different organizations may be stored separately (e.g., logically separated or physically separated), and particular access protocols may be tailored to enable a subset of organizations to access one another's data based on predetermined agreements.

Figure 3:
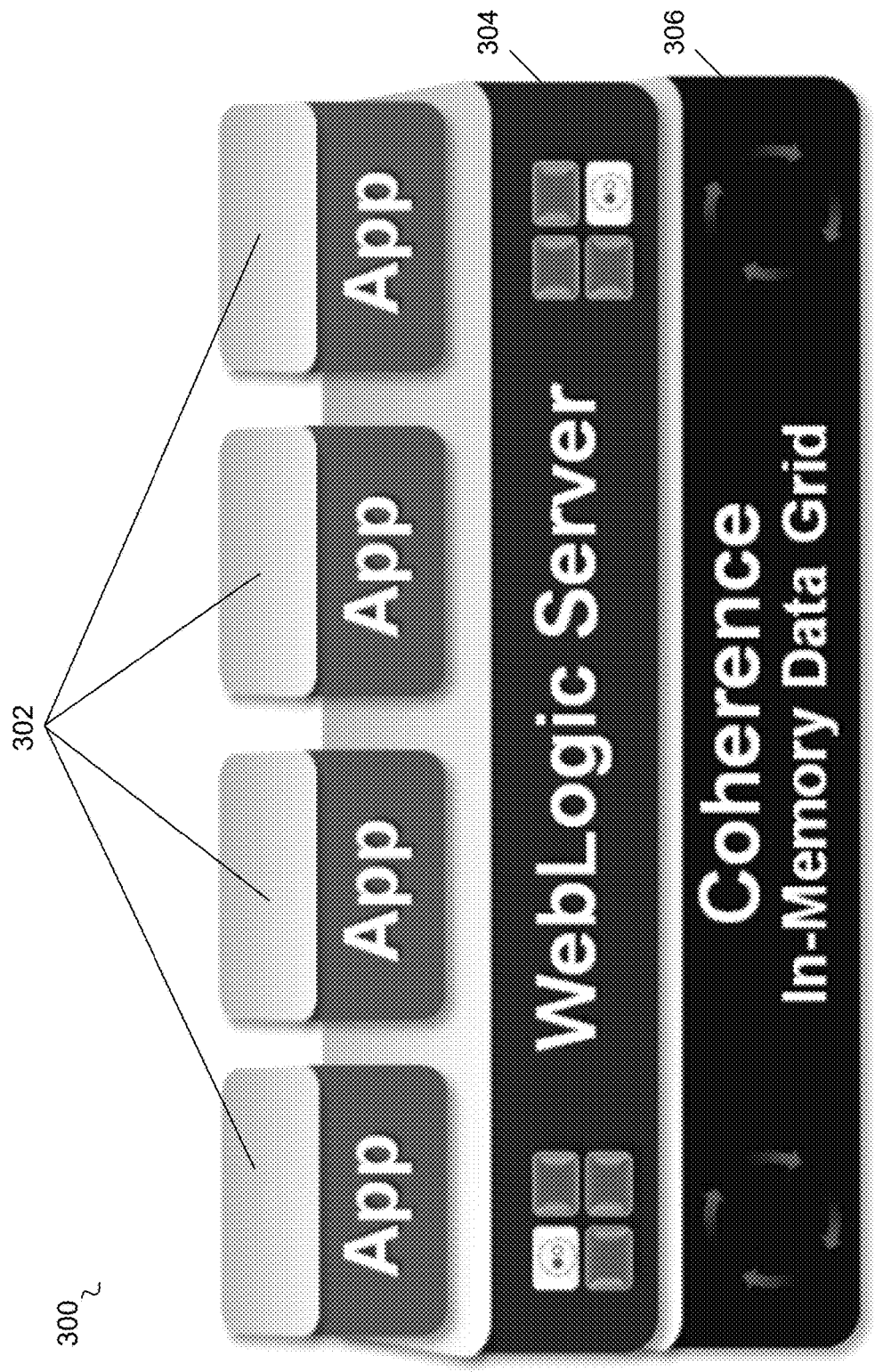
FIG. 3 illustrates a block diagram of a service architecture for cross-domain tracking of online wireless device activity according to another example embodiment.

FIG. 3 illustrates another block diagram of a service architecture for cross-domain tracking of online wireless device activity according to an example embodiment. In some embodiments, system 300 depicts a portion of system 100 of FIG. 1. As shown in FIG. 3, system 300 can include applications 302, web server tier 304, and data layer 306. Applications 302 can be application servers or web servers that implement at least a portion of various web applications or websites. In some examples, applications 302 may be a portion of cloud service provider 108 of FIG. 1 or other cloud service providers (not depicted in FIG. 1) affiliated with web server tier 304. In an embodiment, web server tier 304 is an Oracle® WebLogic server.

Web server tier 304 can implement an API for providing visitor identifier and/or visit identifier services to applications 302. For example, web server tier 304 may be a portion of visitor ID service 110 of FIG. 1. Data layer 306 can be a cache or backend data center that stores information related to the visitor ID tracking services, such as visitor identifiers and, in some embodiments, wireless device online activity information. In some examples, data layer 306 can be a portion of database 112 of FIG. 1, and in other examples data layer 306 can be separate from database 112. Embodiments of data layer 306 include an in-memory cache or in-memory data grid (e.g., "Coherence" from Oracle Corp.).

In some embodiments, system 100 and system 300 may be implemented in combination and certain elements of system 100 and system 300 may be combined or separated, for instance as described above. For example, a wireless device 102 may be in communication with one of applications 302, for instance to access a website hosted by the application. When the wireless device 102 accesses the website, the one application 302 can determine whether a predetermined code is stored on wireless device 102. For example, if wireless device 102 previously visited a website implemented at least in part by any of applications 302 (or implemented by some other affiliated could service provider in communication with an ID service provider similar to web server tier 304), a predetermined code may have been stored on wireless device 102. The predetermined code can comprise a cached web resource and can further allow a persistent identifier to be stored on wireless device 102 for identification purposes. In some embodiments, the predetermined code may be a client-side JavaScript file, JavaScript object notation ("JSON") or JavaScript object notation with padding ("JSON-P") file, XML file, or any other suitable file that includes an identifier for wireless device 102. For example, the identifier can be a visitor identifier returned from an API call to web server tier 304 (or a similar weblogic server), as detailed below. In some embodiments, the identifier identifies a combination of a web browser (e.g., Google Chrome®, or any other suitable web browser) and wireless device 102. For example, the predetermined code may comprise a cached web resource stored on wireless device 102 in association with a particular web browser.

In an embodiment, the predetermined code that includes the visitor identifier may be stored on wireless device 102, and the one application 302 can retrieve the code. For example, the code may be stored in a predetermined storage location of wireless device 102, and the one application 302 may determine whether the code is stored on the wireless device if it is retrievable from the predetermined location.

In another embodiment, the predetermined code including the visitor identifier may not be located on wireless device 102. In this example, wireless device 102 (or the combination of a particular web browser and wireless device 102) may not yet be associated with an identifier, and the one application 302 may issue an API call to web server tier 304 so that a visitor identifier can be issued for wireless device 102. For example, the one application 302 may issue an API call to web server tier 304 for a unique visitor identifier. Once issued, the one application 302 may store code that includes the assigned visitor identifier onto wireless device 102 (e.g., as a JavaScript file, JSON or JSON-P file, XML file, or the like). In an example, the exposed API may be defined as a representative state transfer ("REST") web service that leverages web identifiers such a URL or uniform resource identifier ("URI"). For example, a sample REST API call can be: http://hostname/unified/visitor/[variable_information]. The variable_information may be an account identifier for the wireless device (such as a cloud service account, wireless subscription account, or any other suitable account), a hardware identification number, a global mobile subscriber number for the wireless device ("IMSI"), or any other suitable information associated with the wireless device. Other suitable formats for the exposed API, such as a Simple Object Access Protocol ("SOAP") web service, may be implemented.

In some embodiments, web server tier 304 may also be used to manage a wireless device's individual visits using visit identifiers for the wireless device. For example, where wireless device 102 is accessing a first of applications 302, the application may issue an API call to web server tier 304 to retrieve a visit identifier for wireless device 102 (or a combination of wireless device 102 and a web browser). In this example, the visitor identifier stored on wireless device 102 is included in the API call. In some circumstances, wireless device 102 may concurrently access a second of applications 302. For example, if a user of wireless device 102 is researching a product or service online, the user may access a number of websites or other online resources about the product or service. In this example, the second of applications 302 may also issue an API call that includes the visitor identifier stored on wireless device 102 to web server tier 304. Because web server tier 304 has already issued a visit identifier for the visitor identifier stored on wireless device 102 based on API call from the first of applications 302, the API call from the second of applications 302 will return the same visit identifier returned to the first of applications 302. Such functionality allows individual visits to be tracked across websites, platforms, or domains. In an embodiment, web server tier 304 maintains the life of a visit identifier, provides expiration timers for a visit identifier, and issues a new visit identifier for a particular visitor identifier when the previous visit identifier has expired. Example implementations include visit identifiers being stored and managed at data layer 306. The following is example pseudo code that can provide an embodiment of interfacing with a visitor/visit identity service API:

```
Sample JavaScript to call Unified Visit Id Services
XML
var getVisitorXML = function( ) {
  var request = $.ajax({
    type: "GET",
    contentType: "application/xml; charset=utf-8",
    dataType: "xml",
    url: "/Visit/unified/visitor/" + $("#accountId").val( ) + getVisitorId( ) + "?" + dnc( )});
  request.done(function(xml) {
    $xml = $(xml);
    $("#serverResponse").val(xmlToString(xml));
    $visitorId = $xml.find("visitorId");
    setVisitorId($visitorId.text( ));
  });
```

```
    request.fail(function(msg) {
      alert(msg.responseText);
    });
  };
 JSON
 var getVisitorJSON = function( ) {
   var request = $.ajax({
    type: "GET",
    contentType: "application/json; charset=utf-8",
    dataType: "json",
    url: "/Visit/unified/visitor/" + $("#accountId").val( ) + getVisitorId( ) + "?" + dnc( )});
   request.done(function(json) {
    $("#serverResponse").val(JSON.stringify(json));
    setVisitorId(json.visitorId);
   });
   request.fail(function(msg) {
    alert(msg.responseText);
   });
 };
 JSON-P
 var getVisitorJSON_P = function( ) {
   var url = "/Visit/unified/visitor/" + $("#accountId").val( ) + getVisitorId( ) + "?" + "callback=?&" +
dnc( );
  $.ajaxSetup({ scriptCharset: "utf-8" , contentType: "application/javascript; charset=utf-8"});
  $.getJSON(url)
    .done(function(data) {
      $("#serverResponse").val("jQueryFunction(" + JSON.stringify(data) + ")");
      setVisitorId(data.visitorId);
    })
    .fail(function(data) {
      console.log(data);
    });
 };
  XML
  var getVisitXML = function( ) {
    var request = $.ajax({
      type: "GET",
      contentType: "application/xml; charset=utf-8",
      dataType: "xml",
      url: "/Visit/unified/visit/" + $("#accountId").val( ) + "/" + $("#visitorId").val( ) + "?" + dnc( )});
    request.done(function(xml) {
      $xml = $(xml);
      $("#serverResponse").val(xmlToString(xml));
      $visitId = $xml.find("visitId");
      setVisitId($visitId.text( ));
    });
    request.fail(function(msg) {
      alert(msg.responseText);
    });
  };
 JSON
 var getVisitJSON = function( ) {
  var request = $.ajax({
    type: "GET",
    contentType: "application/json; charset=utf-8",
    dataType: "json",
    url: "/Visit/unified/visit/" + $("#accountId").val( ) + "/" + $("#visitorId").val( ) + "?" + dnc( )});
   request.done(function(json) {
    $("#serverResponse").val(JSON.stringify(json));
    setVisitId(json.visitId);
   });
   request.fail(function(msg) {
    alert(msg.responseText);
   });
 };
  JSON-P
  var getVisitJSON_P = function( ) {
    var url = "/Visit/unified/visit/" + $("#accountId").val( ) + "/" + $("#visitorId").val( ) + "?" +
"callback=?&" + dnc( );
    $.ajaxSetup({ scriptCharset: "utf-8" , contentType: "application/javascript; charset=utf-8"});
    $.getJSON(url)
      .done(function(data) {
        $("#serverResponse").val("jQueryFunction(" + JSON.stringify(data) + ")");
        setVisitId(data.visitId);
      })
      .fail(function(data) {
        console.log(data);
      });
  };
```

-continued

```
Additional Services
<script type="text/javascript">
var getVersion = function( ) {
var request = $.ajax({
  type: "GET",
  contentType: "text/html; charset=utf-8",
  url: "/Visit/unified/version?" + dnc( )});
request.done(function(data) {
  $("#serverResponse").val(JSON.stringify(data));
});
request.fail(function(msg) {
  alert(msg.responseText);
});
};
var getVisitJSON_TTL = function( ) {
var request = $.ajax({
  type: "GET",
  contentType: "application/json; charset=utf-8",
  dataType: "json",
  url: "/Visit/unified/visit/ttl" + $("#accountId").val( ) + "/" + $("#visitorId").val( ) + "?" + dnc( )});
request.done(function(json) {
  $("#serverResponse").val(JSON.stringify(json));
  setVisitId(json.visitId);
});
request.fail(function(msg) {
  alert(msg.responseText);
});
};
</script>
Sample REST Service Responses
Visitor Id Service
Here are sample responses after calling;
/unified/visitor/1999
JSON
{"visitorId":"1999-8386182976397663020"}
XML
<?xml version="1.0" encoding="UTF-8" standalone="yes"?>
<visitor><visitorId>1999-8386182976397663020</visitorId></visitor>
JSON-P
jQueryFunction({"visitorId":"1999-8386182976397663020"})
Visit ID Service
Here are sample responses after calling;
unified/visit/1999/1999-8386182976397663020
JSON
{"timeToLive":"120000","visitId":"5534eeb9-9499-40fe-940e-7228d885ff22"}
XML
<?xml version="1.0" encoding="UTF-8" standalone="yes"?>
<visit><timeToLive>120000</timeToLive><visitId>5534eeb9-9499-40fe-940e-7228d885ff22</visitId></visit>
JSON-P
jQueryFunction({"timeToLive":"120000","visitId":"5534eeb9-9499-40fe-940e-7228d885ff22"})
Visit TTL Service
Sample response after calling;
/unified/visit/ttl/1999/1999-8386182976397663020
JSON
{"timeToLive":"106413","visitId":"5534eeb9-9499-40fe-940e-7228d885ff22"}
```

In some embodiments, as a browser running on wireless device 102 accesses different portions of the website implemented at least in part by the one application 302, online activity for wireless device 102 can be stored in association with the visitor ID issued by web server tier 304. For example, if a user uses the web browser to view a product or service, the viewed product or service may be stored in association with the visitor identifier. In another example, if a user uses the web browser running on wireless device 102 to perform a search query that results in a list of products or services, the search query and/or the results list of the products or services (or a portion of such a list) may be stored in association with the visitor identifier.

Embodiments also include storing online activity in association with the visitor identifier and the visit identifier for wireless device 102. The association with a visit identifier can illustrate additional relationships between products or services (i.e., products or services viewed or searched during the life of the same visit identifier). In various embodiments, the stored data may be stored at data layer 306, database 112 of FIG. 1, or at some other database.

In some embodiments, online activity for wireless device 102 may be stored in the data table of a relational database or in a data structure of a NoSQL database or HFDS. For example, a simplistic and/or flexible data structure in a NoSQL database may be leveraged to store simple associations between the tracked online activity for a wireless device and the visitor identifier (and at times visit identifier) for the wireless device. An implementation that leverages a simplistic data structure may improve retrieval times, simplify implementation and thus reduce cost, and provide a high level of availability.

In some embodiments, as wireless device 102 visits websites implemented at least in part by any of applications 302, the applications may retrieve the code that includes the identifier from wireless device 102 and store the online activity. Because web server tier 304, data layer 306, and any other database that stores the wireless device activity (not depicted) are accessible across a plurality of applications (and thus implemented websites) online activity for wireless device 102 can be tracked and/or aggregated across a plurality of domains, such as across e-commerce websites, brick and mortar storefront associated websites, product or service aggregator or review websites, social media platforms, and any other suitable website, or across web services such as Oracle® Service Cloud, Oracle® Marketing Cloud, Oracle® Adaptive Intelligence Applications, or any other suitable web service.

Embodiments further include leveraging this tracked online activity to selectively provide context aware or location aware services to a wireless device that relate to a storefront to which the wireless device is physically proximate. Referring back to FIG. 1, wireless device 102 may access a website that is implemented at least in part by cloud service provider 108 at a first time. For example, a user of wireless device 102 may use a web browser to access the mobile website of an e-commerce merchant on a Monday morning. The mobile website may be implemented at least in part by cloud service provider 108, such that when wireless device 102 accesses the mobile website a visitor identifier is retrieved from the wireless device.

Figure 4:
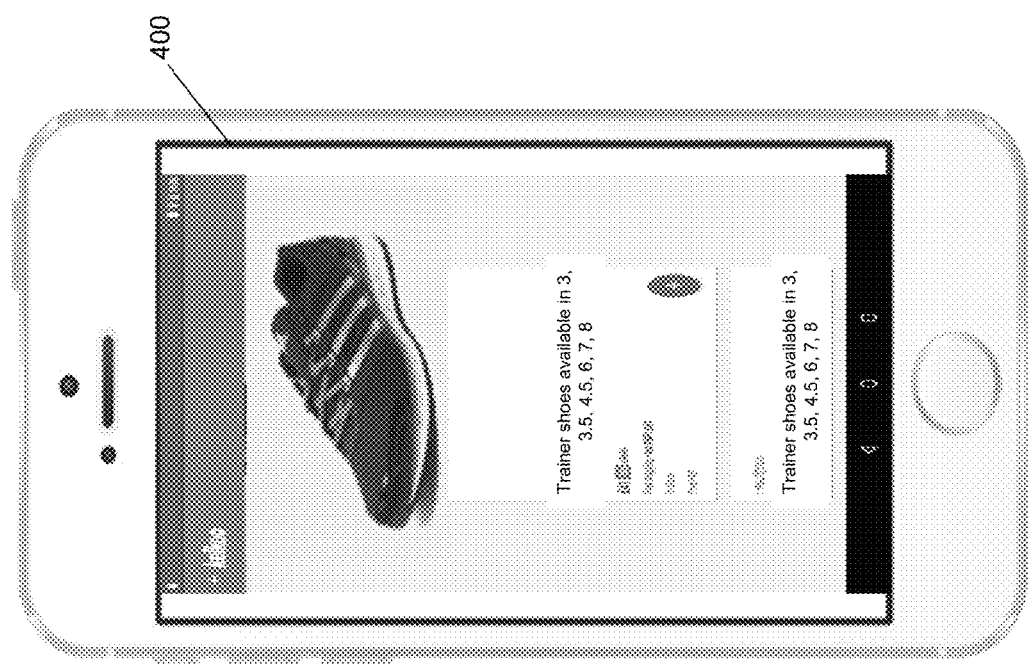
FIG. 4 illustrates an example graphical user interface of a mobile website for cross-domain tracking of online wireless device activity according to an example embodiment.

When accessing the mobile website, the user may view a product or service. FIG. 4 illustrates an example graphical user interface of a mobile website for cross-domain tracking of online wireless device activity according to an example embodiment. Graphical user interface 400 depicts a browser of a wireless device, for instance wireless device 102. In the illustrated embodiment, wireless device 102 is accessing a mobile website where the user of the wireless device is viewing a specific variety of athletic shoes. In accordance with the described embodiments, wireless device 102's online activity on the mobile website can be tracked and stored in association with the wireless device's identifier. For example, the particular pair of athletic shoes viewed by wireless device 102 on the mobile website may be stored in association with the retrieved identifier. In some embodiments, metadata about the product or service viewed may also be stored, such as a size or size range for the viewed pair of athletic shoes. In some embodiments, various other online activity for a user of wireless device 102 on the first website can be tracked and stored in association with the retrieved identifier. For example, products or services added to a shopping cart or added to a wish list, product or service recommendations received and/or accepted by the user, product or service searched for by the user, search queries, and other relevant online activity can be tracked and stored at data layer 306 in association with the identifier.

At a second time, the user of wireless device 102 may visit a shopping center, and wireless device 102 may be situated near storefront 104. For example, on the following Tuesday afternoon the user of wireless device 102 may go to a shopping mall that includes storefront 104. As illustrated in FIG. 1, at the second time, wireless device 102 is in proximity range of wireless transmission source 106. In embodiments, wireless device 102 can be configured to receive communications from proximate wireless transmission sources and/or scan for proximate wireless transmission sources. For example, wireless device 102 may be configured to receive communications from a Physical Web transmission device. The Physical Web is a lightweight discovery protocol that relies on associations between physical things, such as a storefront, and an online resource, such as a URL. A wireless device that is configured to participate in such a discovery protocol can discover URLs that are associated with nearby physical things, and thus access online resources about the physical thing or otherwise interact with the nearby physical things online.

In an embodiment, wireless device 102 may opt-in to receiving Physical Web notification messages by enabling the "Nearby" feature, for instance on an Android® wireless device. Other suitable mobile operating systems may include other techniques for opting-in to such a feature, for example by configuring the mobile operating system to discover Physical Web broadcasting devices (or similar devices), such as wireless transmission source 106. Some implementations may include a specific application or browser, such as Google Chrome®, and use of the application or browser to configure wireless device 102 to interact with the Physical Web or other proximate devices. In some embodiments, wireless device 102 will also enable other features, such as location services and Bluetooth® connectivity, in order to receive Physical Web notification messages.

Wireless transmission source 106 may be configured to serve as a beacon that allows proximate wireless devices to discover a URL associated with storefront 104. In an example, wireless device 102 may receive a Physical Web related message from transmission source 106, such as a message that includes a URL associated with storefront 104. The notification can be a broadcasted URL, for example in an Eddystone® URL format. In some examples, wireless transmission source 106 may transmit the message over a Bluetooth® broadcast that is received by proximate wireless devices, such as wireless device 102.

Figure 5:
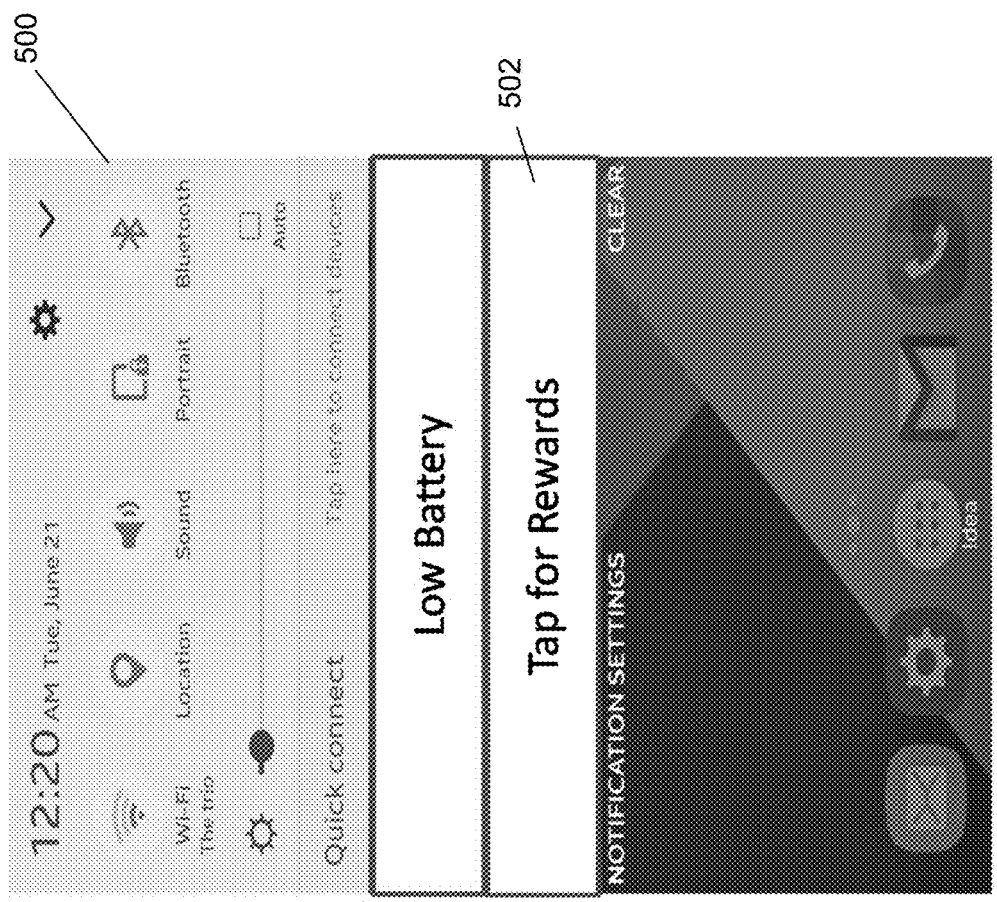
FIG. 5 illustrates an example graphical user interface of a wireless device for providing context aware mobile services according to an example embodiment.

FIG. 5 illustrates an example graphical user interface of a wireless device for cross-domain tracking of online wireless device activity according to an example embodiment. Graphical user interface 500 depicts a user interface of a wireless device, for instance wireless device 102, after receiving a Physical Web notification message. In the illustrated embodiment, wireless device 102 receives a notification from transmission source 106 that indicates to the user that online interaction with storefront 104 is available. After suitable notification alert (e.g., audible message chime, vibration, and the like), the user of wireless device 102 may be prompted to accept the notification. In some embodiments, the notification alert may be a non-invasive (such as non-vibrating) and may be triggered in certain circumstances, such when wireless device 102 is actively being used by a user (e.g., not in idle mode).

For example, graphic user interface 500 displays notification 502 that indicates to the user of wireless device 102 that a notification has been received and that prompts interaction with the user. Based on notification and the included URL, wireless device 102 can click notification 502 to access the store specific website for storefront 104. For example, clicking notification 502 may prompt wireless device 102 to open a web browser and access the store specific website using the included URL. In some embodiments, the URL may be validated by a proxy service before wireless device 102 accesses the URL via the notification. While not depicted, some embodiments may include a plurality of notifications similar to notification 502, and in these examples the notification may be ranked according to proximity of the wireless transmission source that triggered the notification (e.g., signal strength), user preference, browsing history, or any other suitable ranking.

In other embodiments, the user of wireless device 102 can be prompted to interact with storefront 104 in other suitable ways. For example, notifications may prompt the user to click for service, such as a specialized service for the user, tap for a product sample, tap to order a particular product or service, or to join a waiting queue, tap to access a frequently asked questions ("FAQ") page, tap for product or service reviews, tap for a store map, for example a map that indicates a product or service location, tap to chat with a store, product, or service representative, tap to download an application used to interface with storefront 104, or any other suitable service.

Once wireless device 102 accesses the store specific website, cloud service provider 108 retrieves code from wireless device 102 that includes a visitor identifier, as described in various embodiments. Based on the visitor identifier, cloud service provider 108 can then retrieve online activity for wireless device 102 from database 112. In this example, database 112 at least stores wireless device 102's online activity from Monday morning, in particular the viewed pair of athletic shoes.

In some embodiments, the online activity for wireless device 102 may be compared to products or services at storefront 104, such as an inventory of available products at the storefront. For example, an identifier for the viewed pair of athletic shoes, such as a Stock keeping unit ("SKU") number, universal product code ("UPC"), global trade item number ("GITN"), or any other suitable identifier, can be used to search the inventory at storefront 104. In addition, in some embodiments metadata for a stored product or service may also be used to search storefront 104's inventory, such as searching for a particular size of particular athletic shoes. In some embodiments, a database that stores the inventory for storefront 104 may be connect to cloud service provider 108, and the cloud service provider may query the database to identify a match between wireless device 102's online activity and the inventory for storefront 104.

In other embodiment, computing devices 114 may be associated with storefront 104, and the computing devices may be communicatively connected to a database that stores the inventory information. In this example, the online activity for wireless device 102 may be transmitted from cloud service provider 108 to computing devices 114 such that computing devices 114 can query the database that stores the inventory information to determine a match.

Figure 6:
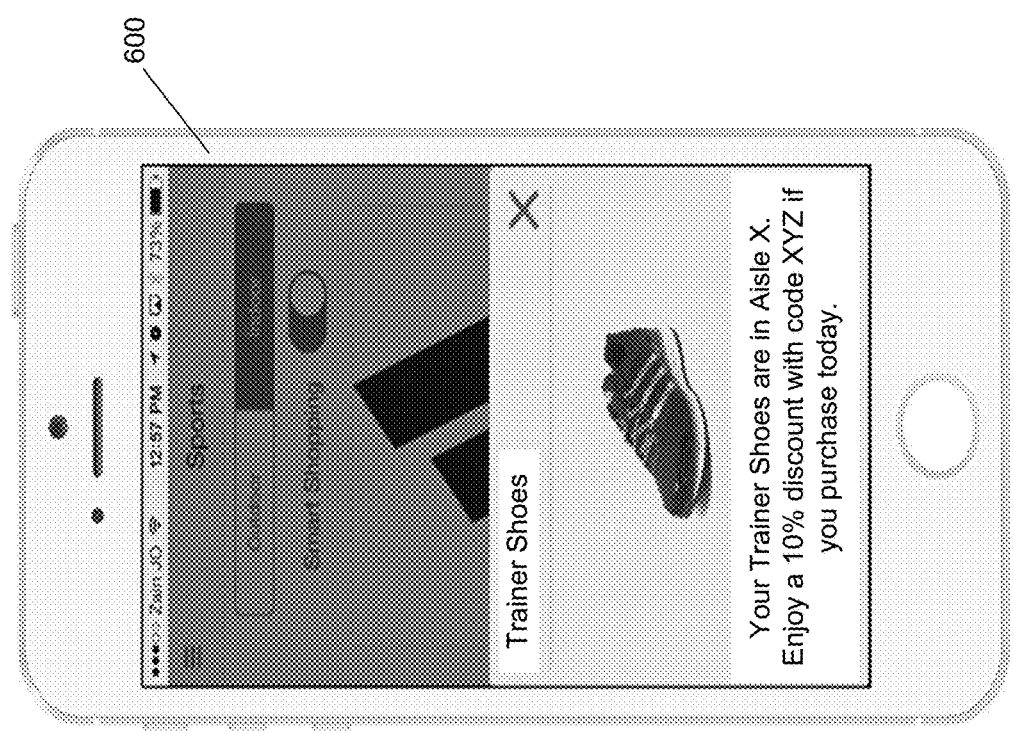
FIG. 6 illustrates an example graphical user interface of a mobile website for providing context aware mobile services according to an example embodiment.

FIG. 6 illustrates an example graphical user interface of a mobile website for providing context aware mobile services according to an example embodiment. Graphical user interface 600 depicts a user interface of a wireless device, for instance wireless device 102, after receiving context aware mobile services. In the illustrated example, storefront 104's inventory is searched to determine that the pair of athletic shoes previously viewed on wireless device 102 are available at the storefront. Wireless device 102 is transmitted a message that notifies the wireless device of the availability. In some embodiments, wireless device 102 is offered a marketing promotion, such as a discount, to encourage a purchase of the shoes and/or is guided to the location of the athletic shoes within storefront 104. For example, wireless device 102 may be transmitted a message that notes the availability of the athletic shoes in a certain aisle, shelf, or other discernible location of storefront 104

Embodiments also include directing the user of wireless device 102 to a representative of storefront 104. For example, computing devices 114 associated with storefront 104 can be notified of the match between the online activity of wireless device 102 and the store inventory. In some embodiments, a code, such as a barcode or quick response ("QR") code, that identifies the athletic shoes from wireless device 102's online activity may be transmitted to wireless device 102. A store representative may use one of computing devices 114 to scan the barcode or QR code and retrieve the item from inventory. The user of wireless device 102 may then purchase the item. In some embodiments, the online activity may be updated with the user's in-store activity. For example, database 112 may store in-store activity for the user of wireless device 102 in association with the identifier issued for the wireless device (such as purchasing of the athletic shoes). Some embodiments can implement progressive web apps or streaming web apps to provide a link between storefront 104 and wireless device 102, where the progressive web apps or streaming web apps may provide similar context aware mobile services to the wireless device.

Embodiments of cross-domain tracking of online wireless device activity and the associated context aware mobile services provide a number of advantageous features. Associating online activity with in-store activity has been a challenging endeavor for merchants, and bulky solutions have been traditionally available. For example, merchants have developed native applications (e.g., available for download from an application marketplace or store) to leverage a shopper's online activity, however, adoption has been slow. The initial steps required from the user (i.e., download of a new application) has greatly reduced the effectiveness of these efforts, as these applications are best suited for a merchant's most loyal customers. The described embodiments allow merchants to provide context aware mobile service to a consumer that is in-store by leveraging their online activity without the need for extra steps, such as downloading a standalone application. Simple configuration of the consumer's wireless device (e.g., enabling location settings, Bluetooth®, Physical Web settings) streamlines the process and provides a simplified solution when compared to native applications.

The technical features described throughout the disclosure provide for these advantages. For example, embodiments include a transmission source, such as a low energy Bluetooth® beacon, that broadcasts a store specific URL to proximate wireless devices. Thus, a user of a wireless device is able to discover the store specific URL when nearby and interact with a storefront online without the need for a native application or other bulky processes. In addition, the online activity tracking functionality described in embodiments provides for advantageous context aware interaction with the in-store consumer, as is further described below.

Embodiments also include a code that is stored locally on a user's wireless device such that a persistent identifier can be retrieved from the wireless device for online activity tracking purposes. This code and identifier similarly provide a lightweight yet robust solution to online activity tracking. For example, use of code, such as a client-side JavaScript file, rather than a traditional cookie, enables a dependable solution. A cookie, or a HTTP cookie, can be data stored on a client's device used for a variety of functions, such as user identification, authentication, preparation of customized webpages, website log-in information, tracking, or session management. However, due to the prevalence of cookies and their potential to cause harm, users have a number of setting options that define how cookies are managed on particular device.

Thus, a user may be able to delete cookies or otherwise perform unanticipated changes to the way cookies are managed on the wireless device that affect the manner in which a cloud service provider or web server can interact with the wireless device. Cookie management often includes expiration timers, and thus cookies are often used to store temporary information. With regard to cookies on a wireless device, mobile applications often use a different "sandbox" from one another and mobile browsers often use their own sandbox. Due to these separations, mobile applications have difficulty identifying a visitor as the same person across use of a first application, a different application, and mobile browser. Based on these challenges, cookies can be less effective on mobile platforms than on desktop devices. The use of the disclosed code, or JavaScript file, instead provides a reliable and persistent identifier that the cloud service provider can depend on when tracking online activity. For instance, in an embodiment the code can comprise cached code, and thus can persist until the cache is manually cleared. In some embodiments, that code may be of a simple nature, such as merely storing the assigned visitor identifier without additional functionality. Because of this, the potential harm the code can cause may be limited or non-existent, and thus the code can be free of the user management controls that are exerted over cookies. In addition, because embodiments rely on a web browser rather than standalone applications, the challenges posed by the separations between applications are mitigated in these implementations.

Leveraging a persistent identifier stored on a wireless device also ensures that the tracked online activity specifically pertains to that wireless device. For example, a user account based tracking system would require a particular user to be logged in to track the user's online activity (which describes a low percentage of storefront visitors), and thus such a system can miss valuable context information. Further, such a system would be limited in the context aware mobile services that can be provided if the user is not logged in when shopping in-store. The correspondence between the physical device that was used to perform the online activity and the same physical device being in-store provides greater assurance that the context aware mobile services provided to the wireless device are relevant to the user.

In addition, embodiments that do not leverage a specific user account further reduce the steps on the user required to achieve the context aware mobile services disclosed. These embodiments can also provide the user a degree of anonymity, as the wireless device itself is used to track the online activity rather than a specific user account.

Further, the lightweight and simplified solution also flows from a cloud based approach. Embodiments include tracking online activity from a wireless device when the wireless device communicates with a website, platform, or other web resource implemented at least in part by a cloud servicer provider (or an affiliated cloud service provider). Because the cloud service provider is configured to perform the tracking, the processes that are performed to achieve the tracking are invisible to the wireless device user (though user permissions, opt-in, and voluntary participation are aspects of various implementations). For example, from the wireless device perspective, embodiments rely on code stored on the wireless device that persistently stores an identifier. Otherwise, the wireless device simply performs its basic functions, such as searching a website or viewing products or services. It is the cloud service provider (or others service devices besides the wireless device) that interacts with such a wireless device performing these basic functions in a way that achieves the tracking of online activity.

When proximate to a storefront with a store specific URL and wireless transmission source, the wireless device also performs simple and basic functions, such as enabling certain settings and responding to a notification (e.g., displayed as a push notification). It is again the cloud service provider (or others service devices besides the wireless device) that performs the functionality to achieve the context aware mobile services when the wireless device accesses the store specific URL (e.g., in response to a user interacting with a displayed push notification to access the URL). This cloud based approach similarly reduces the effort or steps to be performed by the wireless device or the user to achieve the benefits of context aware mobile services.

The described embodiments of context aware mobile services are also advantageous over other location based mobile services, such as geofencing. A geofence is a virtual perimeter for a real-world geographic area. For example, a wireless device with location based services enabled may be able to receive location aware services when it is determined that the wireless device is within a particular geofence. However, due to the technologies leveraged by geofence implementations, such as global positions system ("GPS") technology, it can be difficult for systems to distinguish between locations in an area with a number of discrete locations. For example, geofence systems can have difficulty determining which individual storefront a wireless device is located within when the geofence includes a shopping center or mall with a number of storefronts. Because the disclosed embodiments leverage a wireless transmission source with a configurable range, such as a low energy Bluetooth® beacon, the mobile services provided to a wireless device can be specifically tailored to individual locations that would be difficult to distinguish using other systems.

Figure 7:
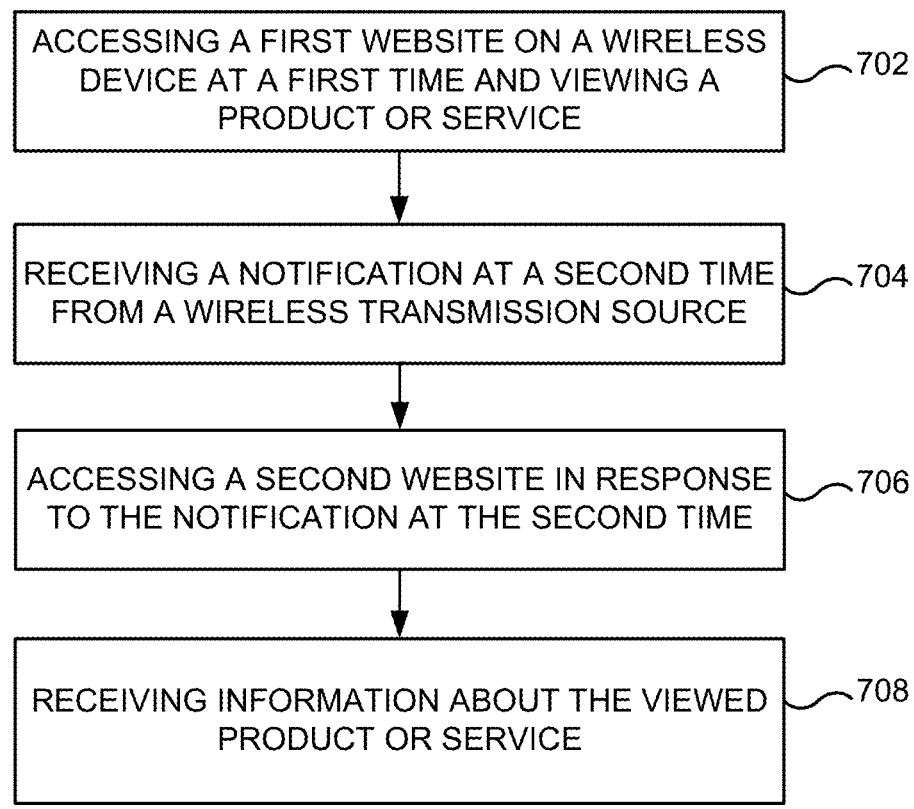
FIG. 7 illustrates a flow diagram for cross-domain tracking of online wireless device activity to provide context aware mobile services according to an example embodiment.

FIG. 7 illustrates a flow diagram 700 for cross-domain tracking of online wireless device activity to provide context aware mobile services according to an example embodiment. In one embodiment, the functionality of FIG. 7, FIG. 8, and FIG. 9 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of flow diagram 700 is performed at a wireless device by hardware, software, or a combination of these.

At 702, referring back to FIG. 1, a first website is accessed on wireless device 102 at a first time, where a product or service is viewed on wireless device 102. In an embodiment, the first website can be implemented at least in part by cloud service provider 108. Some examples include searching for a product or service at wireless device 102 rather than (or in addition to) viewing the product or service.

At 704, a notification is received at wireless device 102 from wireless transmission source 106 when wireless device 102 is proximate to wireless transmission source 106, where the notification is received at a second time and the second time is after the first time. In an embodiment, wireless transmission source 106 can be a low energy Bluetooth® beacon that broadcasts messages. Wireless transmission source 106 can be affiliated with storefront 104 and the broadcast message can include a store specific URL for storefront 104 (e.g., formatted in an Eddystone® URL format). Wireless transmission source 106 may have a limited range, and wireless device 102 may receive the notification from wireless transmission source 106 when located within the range.

At 706, wireless device 102 accesses a second website at the second time in response to the notification. For example, wireless device 102 can access a store specific URL for storefront 104 in response to a notification received from wireless transmission source 106 and displayed on wireless device 102. In an embodiment, the second website (e.g., that corresponds to the store specific URL) can be implemented at least in part by cloud service provider 108.

At 708, information about the product or service viewed (or searched for) on wireless device 102 is received when accessing the second website. In an embodiment, the information about the product or service can include an availability of the product or service at storefront 104, pricing for the product or service at storefront 104, a location of the product or service at storefront 104 (e.g., aisle number, shelf number, and the like), or any other suitable information that relates the product or service to storefront 104. In some embodiments, the information transmitted to wireless device 102 can facilitate locating the product or service in storefront 104 and, in some instances, purchase of the product or service by a user of wireless device 102 (e.g., including facilitating e-commerce payments, such as credit card processing, and identification of a pick-up location for the purchased product or service).

Figure 8:
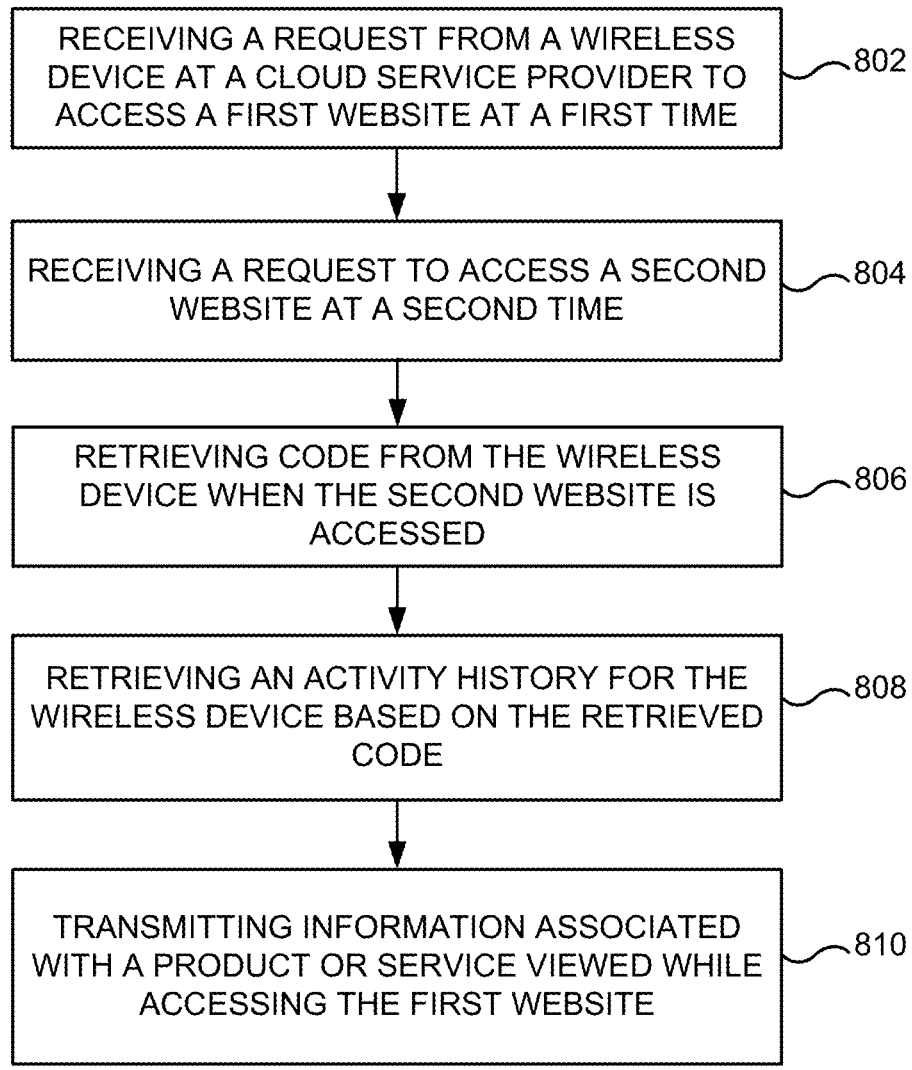
FIG. 8 illustrates another flow diagram for cross-domain tracking of online wireless device activity to provide context aware mobile services according to an example embodiment.

FIG. 8 illustrates a flow diagram 800 for cross-domain tracking of online wireless device activity to provide context aware mobile services according to an example embodiment. In embodiments, the functionality of flow diagram 800 is performed at a cloud service provider or web server by hardware, software, or a combination of these.

At 802, referring back to FIG. 1, a request is received from wireless device 102 at a cloud service provider 108 to access a first website at a first time. In an embodiment, when accessing the first website, wireless device 102 views or searches for a product or service on the website.

At 804, a request is received from wireless device 102 at cloud service provider 108 to access a second website at a second time, where the second time is after the first time. In an embodiment, the second website is affiliated with storefront 104. For example, the request to access the second website from wireless device 102 may be a portion of a Physical Web discovery process (or a similar discovery process) that allows wireless device 102 to discover the store specific website affiliated with storefront 104.

At 806, code that includes a visitor identifier may be retrieved from wireless device 102 when accessing the second website. For example, code that includes a visitor identifier may be retrieved by cloud service provider 108 from wireless device 102 when accessing the second website. In an embodiment, the code may have been persistently stored on wireless device 102 by cloud service provider 108 (or an affiliated cloud service provider) in order to associate wireless device 102 with the visitor identifier. In an embodiment, the code can include a client-side JavaScript file that persistently stores a visitor identifier.

At 808, online activity may be retrieved for wireless device 102 based on the retrieved code and the visitor identifier. For example, the online activity can be retrieved by cloud service provider 108 based on the visitor identifier for wireless device 102. In an embodiment, the online activity may be retrieved from a database that stores online activity for wireless device 102 in association with the visitor identifier, as described with reference to various embodiments. For example, the database may store an association between the product or service viewed (or searched for) on the first website by wireless device 102 and the visitor identifier issued to wireless device 102.

At 810, information associated with the product or service viewed (or searched for) by wireless device 102 on the first website is transmitted to wireless device 102. For example, information related to the product or service and related to storefront 104 can be transmitted by cloud service provider 108 to wireless device 102. In an embodiment, the product or service (or an identifier for the product or service) can be used to search an inventory of storefront 104 to determine information that relates the product or service to storefront 104. The information about the product or service can include an availability of the product or service at storefront 104, pricing for the product or service at storefront 104, a location of the product or service at storefront 104 (e.g., aisle number, shelf number, and the like), or any other suitable information that relates the product or service to storefront 104. In some embodiment, context aware mobile services can be provided to wireless device 102 based on a comparison between the product or service and storefront 104's inventory (e.g., facilitating purchasing of the product or service, such as credit card processing, and locating the product or service within storefront 104). In addition, based on the comparison between the product or service and storefront 104's inventory, computing devices 114, which are affiliated with storefront 104, may be transmitted information about the product or service and also may be provided context aware services to facilitate professional services performed by a user of computing devices 114 (e.g., a sales representative marketing the product or service to the user of wireless device 102).

Figure 9:
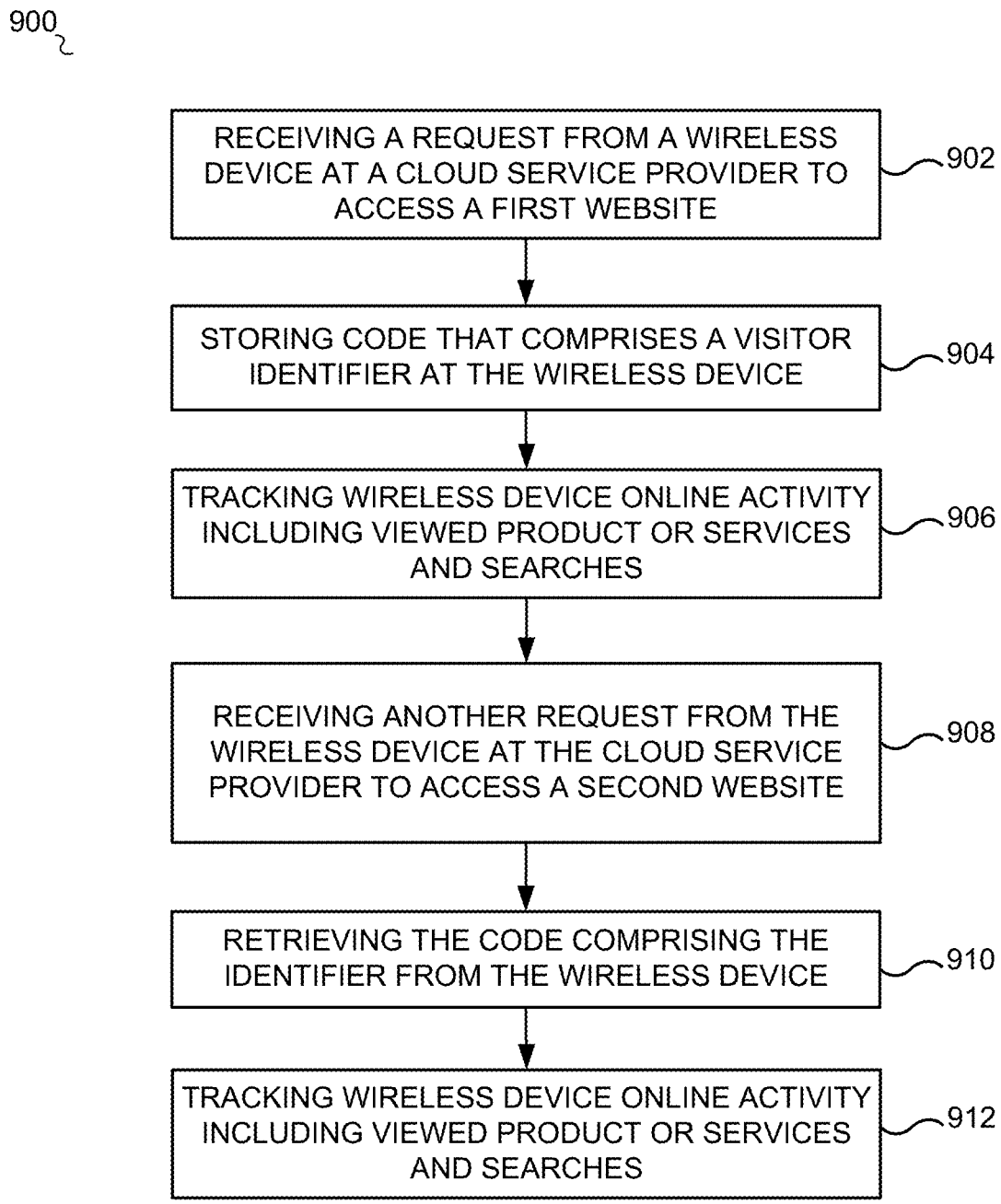
FIG. 9 illustrates another flow diagram for cross-domain tracking of online wireless device activity to provide context aware mobile services according to an example embodiment.

FIG. 9 illustrates a flow diagram 900 for cross-domain tracking of online wireless device activity to provide context aware mobile services according to an example embodiment. In embodiments, the functionality of flow diagram 900 is performed at a cloud service provider by hardware, software, or a combination of these.

At 902, referring back to FIG. 1, a request is received from wireless device 102 at cloud service provider 108 to access a first website at a first time. In an embodiment, cloud service provider 108 implements at least a portion of the first website.

At 904, code that includes a visitor identifier is stored on wireless device 102 by cloud service provider 108. For example, cloud service provider 108 may store code that includes a visitor identifier on wireless device 102. In an embodiment, the code can be persistently stored such that the visitor identifier can be retrieved from wireless device 102 to track online activity for wireless device 102. In an example implementation, the code includes a client-side JavaScript file that is stored in a predetermined memory location at wireless device 102. In some embodiments, visitor ID service 110 can issue the visitor identifier in response to an API call from cloud service provider 108.

At 906, online activity for wireless device 102 is tracked including products or services viewed or searched for on the first website. For example, a user of wireless device 102 may use a web browser to view or search for products or services on the first website. The viewed or searched for products or services (and/or the search queries) can be stored in association with the visitor identifier for wireless device 102, for example in database 112 or some other external database. In an embodiment, the viewed or searched for products or services are stored in association with the visitor identifier in a data structure associated with a NoSQL database. For example, the products or services may be striped (or stored in association) with the visitor identifier.

At 908, a request is received from wireless device 102 at cloud service provider 108 to access a second website at a second time, where the first time is after the second time. In an embodiment, cloud service provider 108 implements at least a portion of the second website.

At 910, code that includes the identifier may be retrieved from wireless device 102 when accessing the second website. For example, the previously stored code that includes the visitor identifier is retrieved by cloud service provider 108 from wireless device 102 when accessing the second website. In an embodiment, cloud service provider 108 may retrieve the code and visitor identifier for a predetermined storage location on wireless device 102.

At 912, online activity for wireless device 102 is tracked including products or services viewed or searched for on the second website. For example, a user of wireless device 102 may use a web browser to view or search for products or services on the second website. The viewed or searched for products or services (and/or the search queries) on the second website can be stored in association with the visitor identifier for wireless device 102, for example in database 112 or some other external database.

In some embodiments, the database that stores the online activity (e.g., viewed or searched for products or services, search queries, and the like) for wireless device 102 can generate an aggregated history of online activity for wireless device 102 that is tracked across a plurality of websites, platforms (e.g., social media platforms), and other web resources. For example, the first website and second website may be affiliated with different organizations or merchants. In one embodiment, the first website may be affiliated with an online retailer while the second website may be affiliated with a brick and mortar retailer that has an online presence. In another embodiment, the first website may be part of a social media platform. In another embodiment, the first website may be a products or services aggregation or rating website and the second website may be affiliated with a merchant. In some embodiments, the tracking may be limited to different domains of an individual organization (e.g., various websites, online resources, or other sales facing components for an individual organization).

In various embodiments, the aggregated history of online activity can then be used to provide context aware mobile services to wireless device 102. For example, when wireless device 102 is in a brick and mortar store location, such as storefront 104, wireless device 102 can be provided information that relates products or services tracked from the wireless device's online activity to the inventory available at storefront 104. In embodiments, wireless device 102 is provided such context aware mobile services when accessing a store specific website for storefront 104, as further described in various embodiments.

In various embodiments, agreements, waivers, and/or voluntary participation acknowledgements may be sought between various interested parties related to data privacy for individuals and organizations. For example, individuals, such as a user of wireless device 102, may voluntarily agree to participate in the disclosed tracking and mobile services, for example in exchange for promotions, such as discounts on products or services. In addition, an organization may voluntarily agree to allow access to the organization's data, such as tracked online activity that has occurred on the organization's website. In some implementations, a plurality of organizations may enter into a data sharing agreement, or a first organization may allow access to its data by a second organization, for example in exchange for compensation, or other consideration.

While various embodiments store code (such as cached code) on a wireless device rather than a cookie to persistently store an issued visitor identifier, various implementations may leverage both stored code and cookies, for example to implement other functions or functions related to the describe tracking. For example, cookies may be used when a wireless device interacts with various websites, such as to log-in, recognize (e.g., a soft log-in, for example to allow viewing but not editing or updating account information), or authenticate a user.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for cross domain tracking of online wireless device activity to provide context aware services, the method comprising:

receiving, at a first time, a request to access a first website from the wireless device at a web server such that a first product comprising a specific product parameter is viewed using the wireless device, the specific product parameter comprising a physical characteristic of the first product, wherein
software code that comprises an identifier is persistently stored on the wireless device during a previous communication with the web server,
the software code comprises a client-side web resource cached in association with a web browser on the wireless device during the previous communication with the web server, and
the identifier is issued for the wireless device by a visitor ID service;

receiving, at a second time, a request to access a second website from the wireless device at the web server, wherein the wireless device is configured to transmit the request to access the second website in response to a notification received at the wireless device from a wireless beacon associated with a physical storefront, the wireless beacon is configured to transmit notifications to proximate wireless devices, and the second website is associated with the physical storefront;

retrieving by the web server the identifier from the software code stored on the wireless device when the second website is accessed at the second time;

retrieving by the web server an online activity history for the wireless device based on the identifier, wherein the online activity history comprises products viewed on the wireless device;

comparing the retrieved online activity history for the wireless device to an inventory of physical products at the physical storefront, wherein the first product comprising the specific product parameter is identified as a match between the retrieved online activity history for the wireless device and the inventory of physical products at the physical storefront; and transmitting to the wireless device an indication that the first product comprising the specific product parameter is in stock at the physical storefront based on the first product comprising the specific product parameter being identified as a match between the retrieved online activity history for the wireless device and the inventory of physical products at the physical storefront, wherein the online activity history for the wireless device is updated with in-store purchase information about the first product when the first product is purchased from the physical storefront based on the indication that the first product is in stock at the physical storefront.

2. The method of claim 1, wherein the transmitted indication comprises a visual quick response ("QR") code for the first product, the visual QR code is configured to be scanned by a system at the storefront, and, after scanning the visual QR code, the system at the storefront is configured to complete a purchase of the first product.

3. The method of claim 1, wherein the wireless beacon comprises a Bluetooth low energy beacon configured to broadcast messages to proximate wireless devices, the proximate wireless devices being configured to display received messages as notifications.

4. The method of claim 1, wherein the first website is associated with an online merchant offering products, the first website being different from the second website, and the online merchant being different from the storefront.

5. The method of claim 1, further comprising tracking, by the web server, activity for the wireless device across a plurality of domains using the identifier, wherein the first website and the second website are implemented at least in part by the web server.

6. The method of claim 5, further comprising:
receiving, at a third time between the first time and the second time, a request from the wireless device to access a third website such that the identifier is retrieved from the software code stored on the wireless device when the third website is accessed, wherein online activity for the wireless device on the third website is tracked by the web server using the retrieved identifier.

7. The method of claim 5, wherein the identifier is issued for the wireless device by the visitor ID service in response to an application programming interface (API) call by the web server, and the visitor ID service is configured to track activity for the wireless device across the plurality of domains using the identifier.

8. The method of claim 1, wherein the first product comprises a physical product with a size range, and the specific product parameter is a specific size within the size range.

9. The method of claim 1, wherein the online activity history for the wireless device comprises the first product in association with the specific product parameter.

10. The method of claim 9, wherein the online activity history for the wireless device is stored in and retrieved from a data structure of a NoSQL database.

11. The method of claim 1, wherein the wireless beacon is configured to transmit an Eddystone uniform resource locator ("URL"), the notification received at the wireless device from the wireless beacon comprises a Physical Web notification with an Eddystone URL, and at the wireless device the Physical Web notification is displayed as a push notification comprising a hypertext transfer protocol ("HTTP") URL based on the Eddystone URL.

12. The method of claim 11, wherein the wireless device transmits the request to access the second website using the HTTP URL from the push notification, the HTTP URL being a URL for the second website associated with the physical storefront.

13. The method of claim 1, wherein during the previous communication with the web server, the software code that comprises the identifier is persistently stored on the wireless device by:
determining, by the web server, that the wireless device does not comprise an identifier issued by the visitor ID service, the determining being based on an attempt to retrieve software code from a predetermined storage location on the wireless device;

issuing, by the web server, a request for a new visitor ID from the visitor ID service when it is determined that the wireless device does not comprise an identifier issued by the visitor ID service, wherein the new visitor ID returned by the visitor ID service is the wireless device's visitor ID;

storing the software code comprising the wireless device's visitor ID returned by the visitor ID service at the predetermined location on the wireless device, wherein the predetermined location comprises a cache at the wireless device and the web server is configured to cache the software code at the predetermined location in association with the web browser.

14. A device comprising:
a processor; and
a memory storing one or more programs for execution by the processor, the one or more programs including instructions for:
receiving, at a first time, a request to access a first website from a wireless device at a web server such that a first product comprising a specific product parameter is viewed using the wireless device, the specific product parameter comprising a physical characteristic of the first product, wherein
software code that comprises an identifier is persistently stored on the wireless device during a previous communication with the web server,
the software code comprises a client-side web resource cached in association with a web browser on the wireless device during the previous communication with the web server, and
the identifier is issued for the wireless device by a visitor ID service;

receiving, at a second time, a request to access a second website from the wireless device at the web server, wherein the wireless device is configured to transmit the request to access the second website in response to a notification received at the wireless device from a wireless beacon associated with a physical storefront, the wireless beacon is configured to transmit notifications to proximate wireless devices, and the second website is associated with the physical storefront;

retrieving by the web server the identifier from the software code stored on the wireless device when the second website is accessed at the second time;

retrieving by the web server an online activity history for the wireless device based on the identifier, wherein the online activity history comprises products viewed on the wireless device;

comparing the retrieved online activity history for the wireless device to an inventory of physical products at the physical storefront, wherein the first product comprising the specific product parameter is identified as a match between the retrieved online activity history for the wireless device and the inventory of physical products at the physical storefront; and transmitting to the wireless device an indication that the first product comprising the specific product parameter is in stock at the physical storefront based on the first product comprising the specific product parameter being identified as a match between the retrieved online activity history for the wireless device and the inventory of physical products at the physical storefront, wherein the online activity history for the wireless device is updated with in-store purchase information about the first product when the first product is purchased from the physical storefront based on the indication that the first product is in stock at the physical storefront.

15. The device according to claim 14, wherein the transmitted indication comprises a visual quick response ("QR") code for the first product, the visual QR code is configured to be scanned by a system at the storefront, and, after scanning the visual QR code, the system at the storefront is configured to complete a purchase of the first product.

16. A method for cross domain tracking of online wireless device activity to provide context aware services, the method comprising:

accessing, at a first time, a first website on a wireless device such that a first product comprising a specific product parameter is viewed on the wireless device, the specific product parameter comprising a physical characteristic of the first product, wherein software code that comprises an identifier is persistently stored on the wireless device using a web server during a previous communication the software code comprises a client-side web resource cached in association with a web browser on the wireless device during the previous communication with the web server, and the identifier is issued for the wireless device by a visitor ID service;

receiving, at a second time, a notification at the wireless device from a wireless beacon associated with a physical storefront when the wireless device is proximate to the wireless beacon;

accessing, at the second time, a second website associated with the physical storefront on the wireless device in response to the notification, wherein the identifier is retrieved from the software code stored on the wireless device when the second website is accessed, and an online activity history including products viewed on the wireless device is obtained by the web server based on the identifier; and receiving at the wireless device an indication that the first product comprising the specific product parameter is in stock at the physical storefront, wherein the indication is received at the wireless device based on a comparison that identifies the first product comprising the specific product parameter as a match between the retrieved online activity history for the wireless device and an inventory of physical products at the physical storefront, and wherein the online activity history for the wireless device is updated with in-store purchase information about the first product when the first product is purchased from the physical storefront based on the indication that the first product is in stock at the physical storefront.

17. The method of claim 16, wherein the received indication comprises a visual quick response ("QR") code for the first product, the visual QR code is configured to be scanned by a system at the storefront, and, after scanning the visual QR code, the system at the storefront is configured to complete a purchase of the first product.

18. The method of claim 16, wherein the software code comprises client-side JavaScript software code and the wireless beacon comprises a Bluetooth low energy beacon configured to broadcast messages to proximate wireless devices, the proximate wireless devices being configured to display received messages as notifications.

19. The method of claim 16, wherein the first website is associated with an online merchant offering products or services, the first website being different from the second website, and the online merchant being different from the storefront.

20. The method of claim 16, wherein the web server tracks online activity for the wireless device such that the tracked online activity is striped with the identifier, the online activity for the wireless device being tracked across a plurality of websites that are implemented at least in part by the web server.

* * * * *